Figure 1:
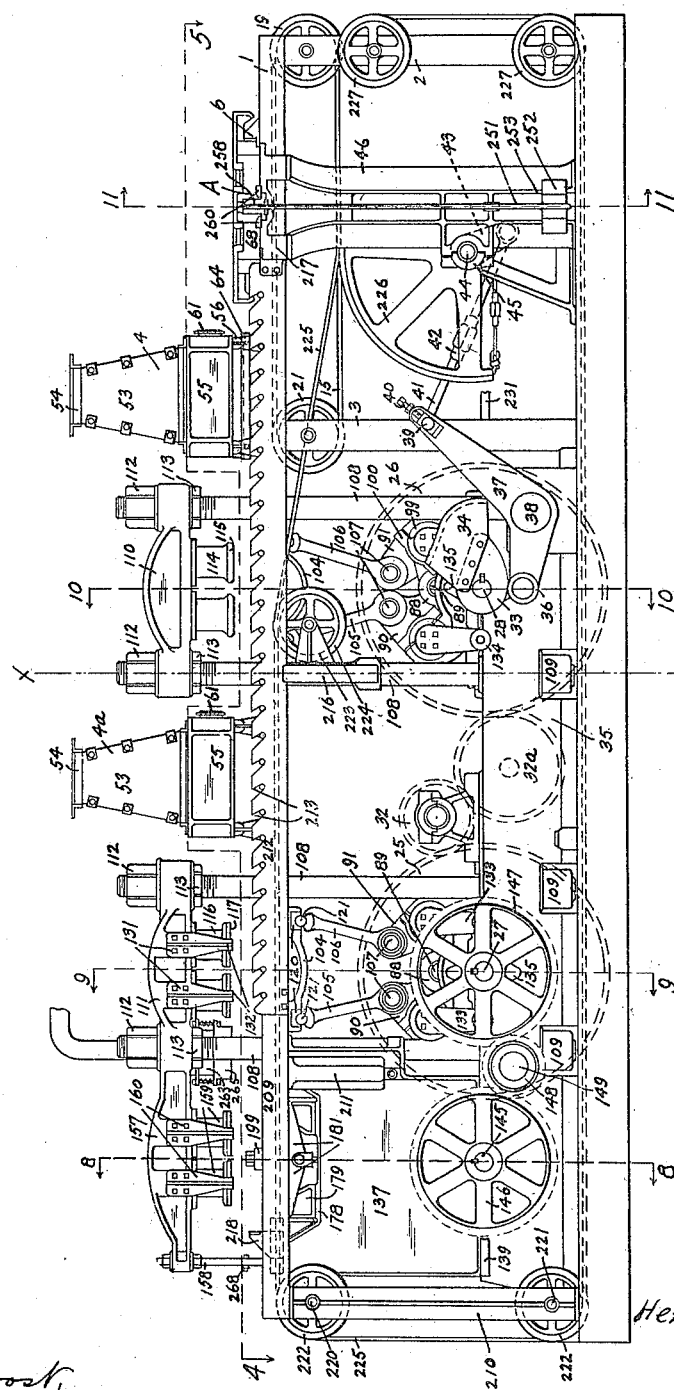

H. N. KILBY.
BRICK MANUFACTURE.
APPLICATION FILED JUNE 30, 1913.

1,231,267.

Patented June 26, 1917.
17 SHEETS—SHEET 2.

Witnesses
L. W. Frost
A. L. Phelps

Inventor
Herbert N. Kilby

By
C. C. Shepherd, Attorney

H. N. KILBY.
BRICK MANUFACTURE.
APPLICATION FILED JUNE 30, 1913.
1,231,267.
Patented June 26, 1917.
17 SHEETS—SHEET 3.
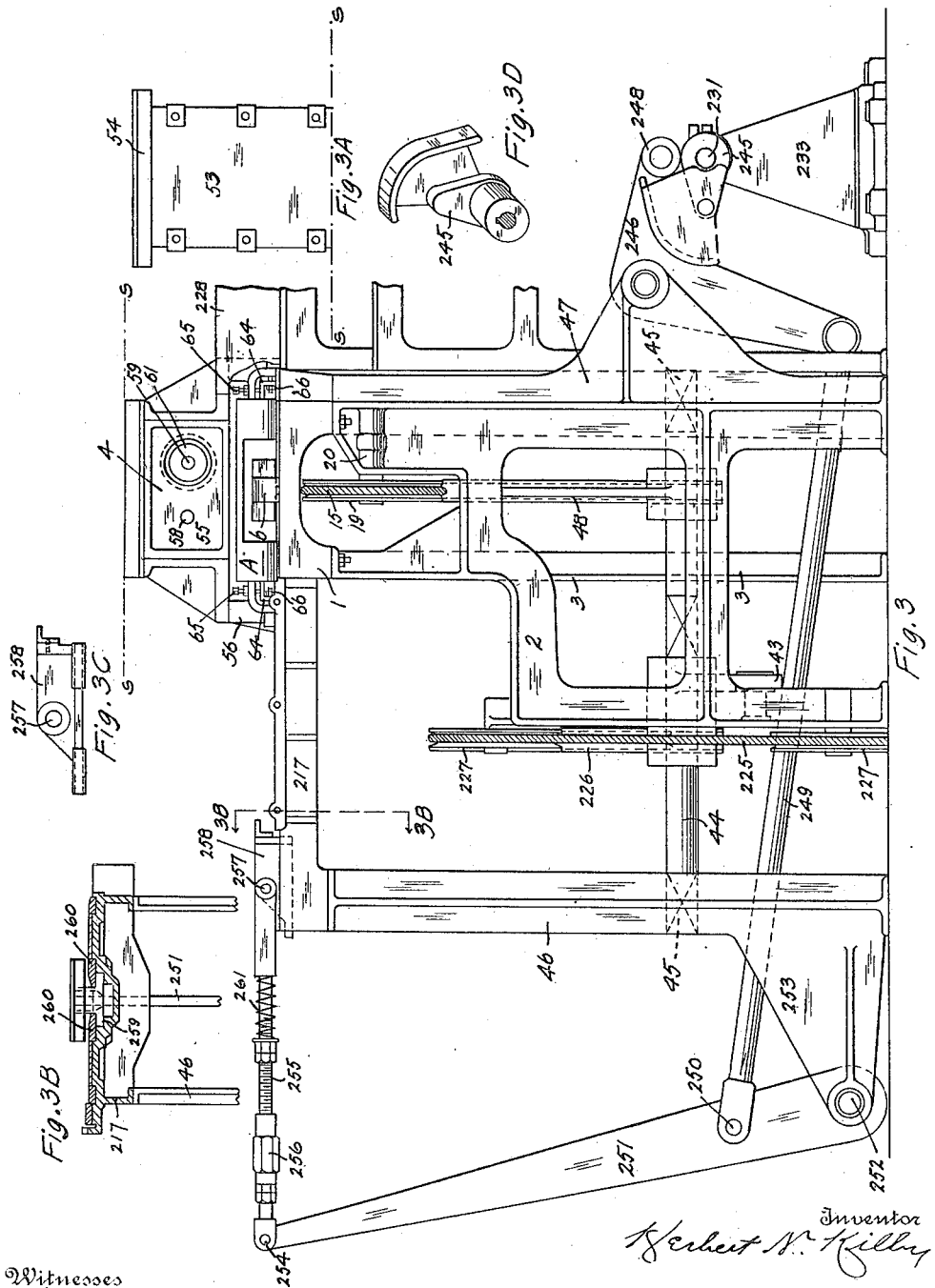

H. N. KILBY.
BRICK MANUFACTURE.
APPLICATION FILED JUNE 30, 1913.

1,231,267.

Patented June 26, 1917.
17 SHEETS—SHEET 4.

H. N. KILBY.
BRICK MANUFACTURE.
APPLICATION FILED JUNE 30, 1913.
1,231,267.
Patented June 26, 1917.
17 SHEETS—SHEET 5.
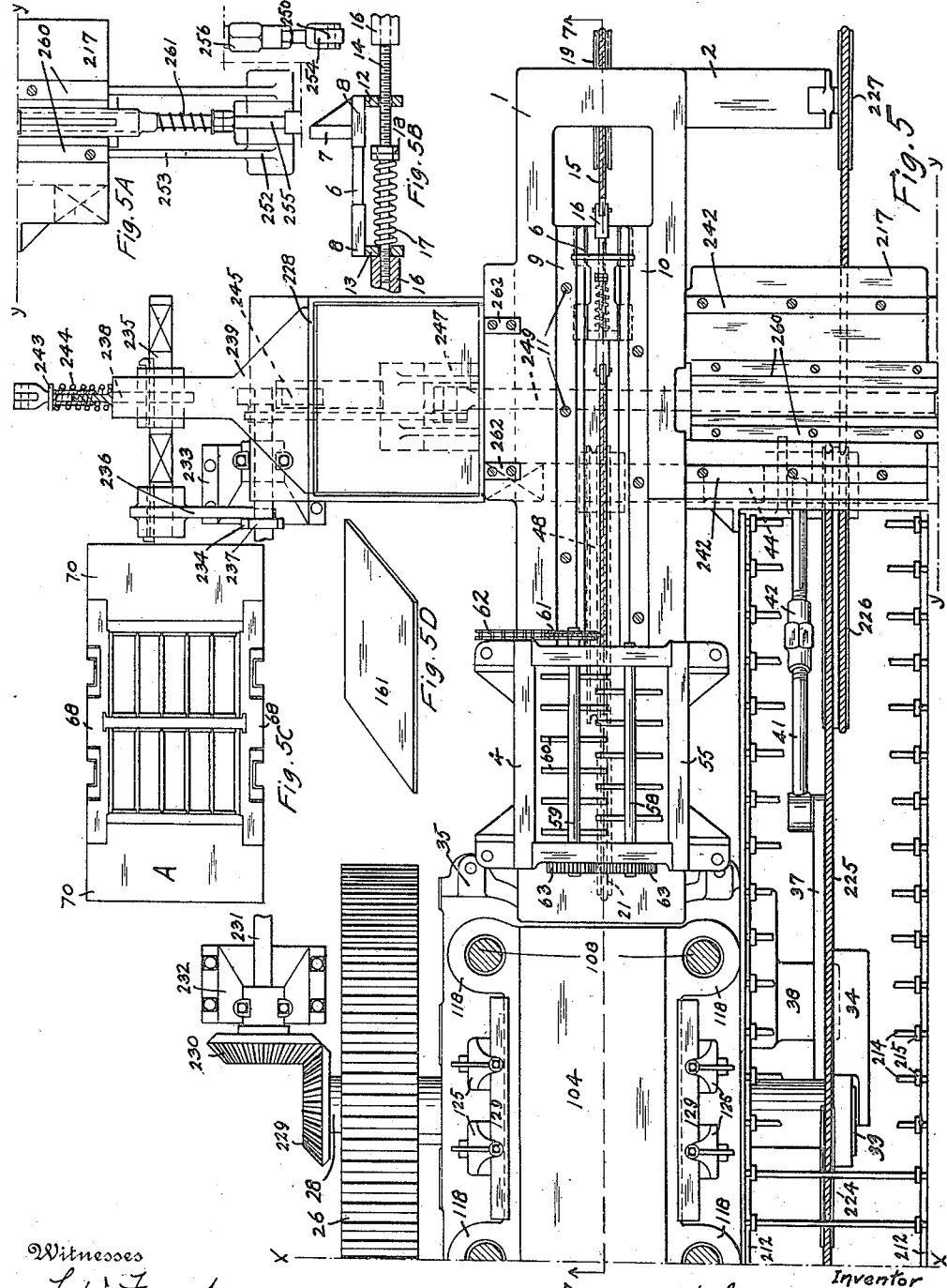
Witnesses
L. W. Foot
A. L. Phelps
Inventor
Herbert N. Kilby
By
C. C. Shepherd, Attorney

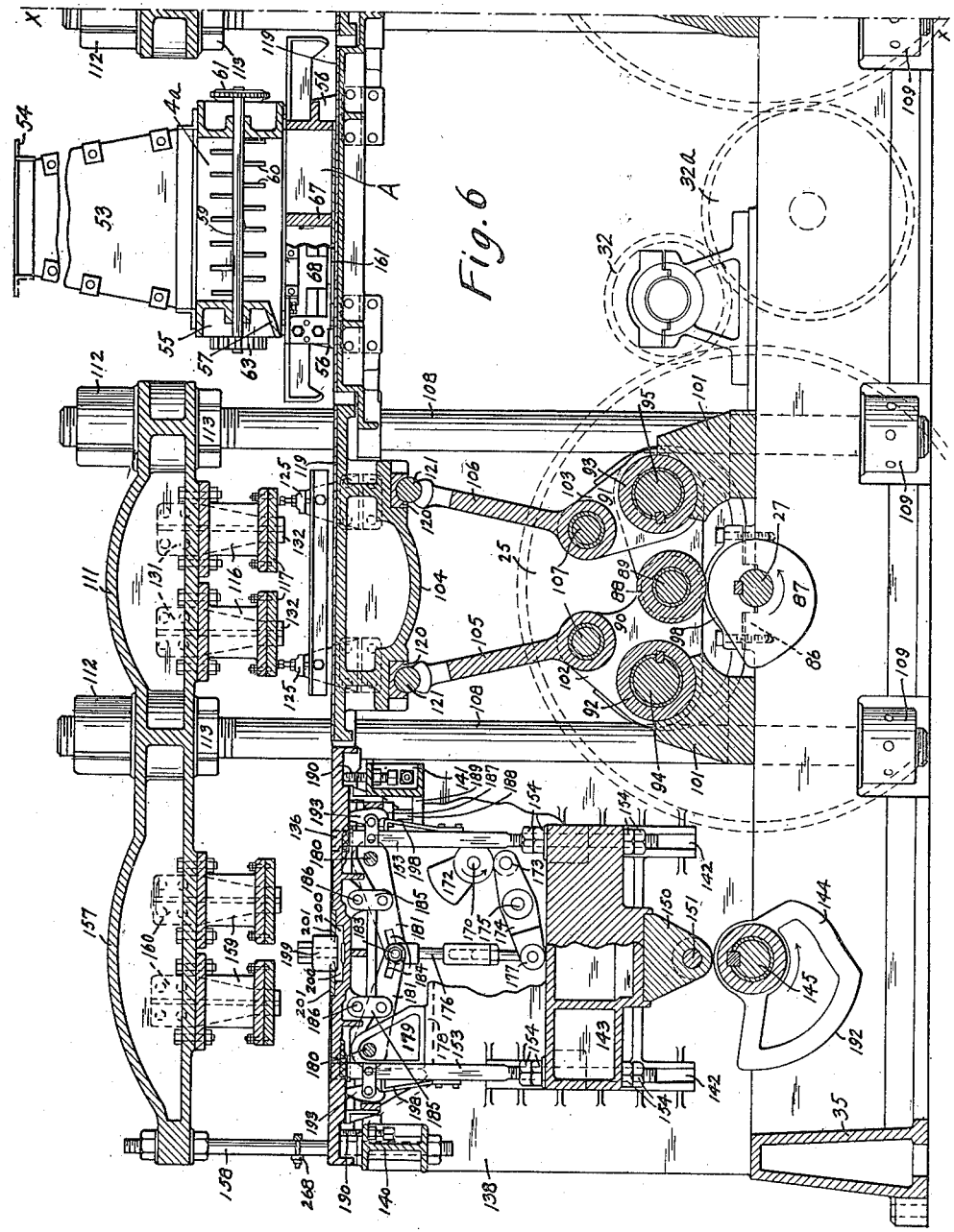

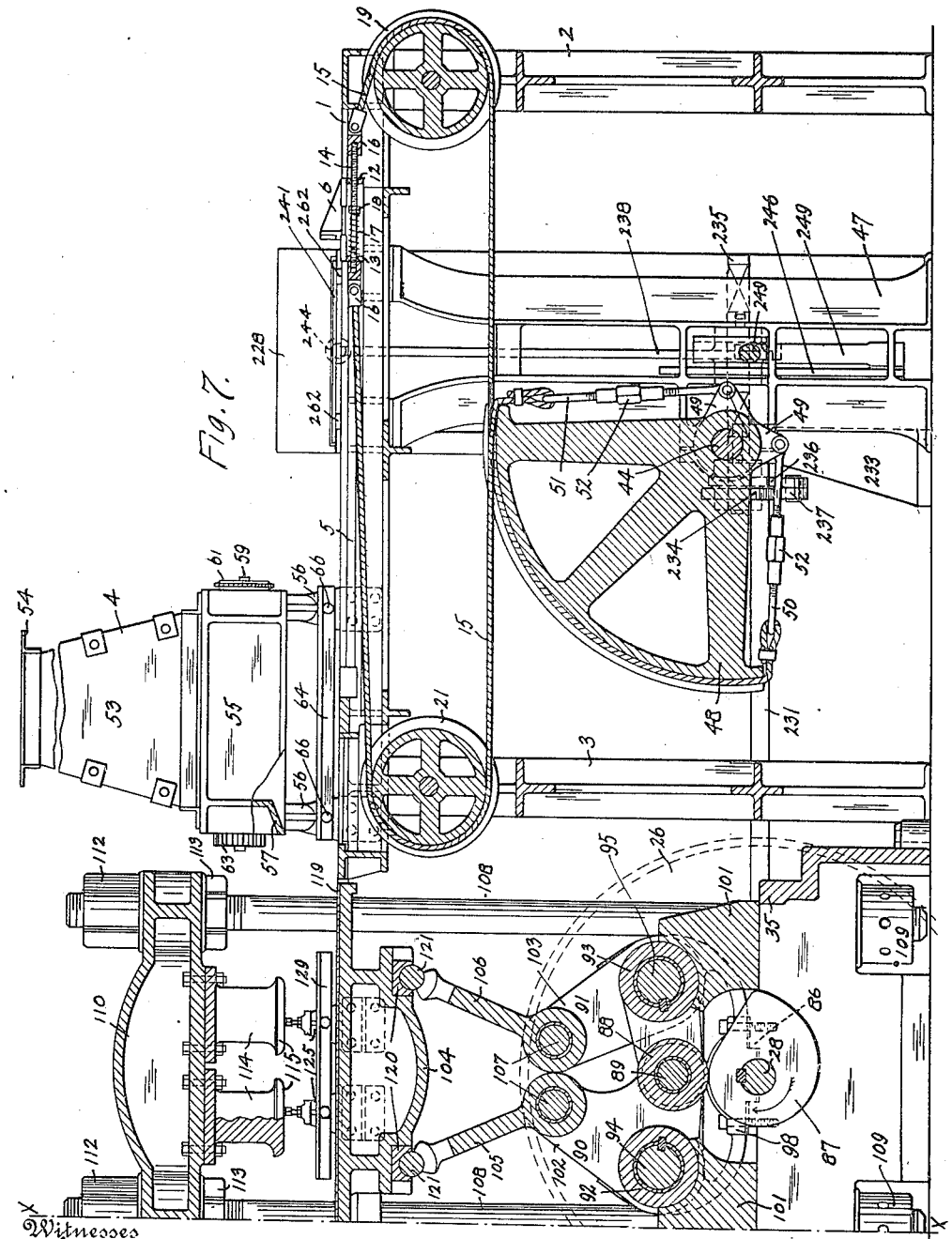

H. N. KILBY.
BRICK MANUFACTURE.
APPLICATION FILED JUNE 30, 1913.

1,231,267.

Patented June 26, 1917.
17 SHEETS—SHEET 8.

Witnesses
L. W. Frost
A. L. Phelps

Inventor
Herbert N. Kilby

By
C. C. Shepherd, Attorney

H. N. KILBY.
BRICK MANUFACTURE.
APPLICATION FILED JUNE 30, 1913.
1,231,267.
Patented June 26, 1917.
17 SHEETS—SHEET 9.
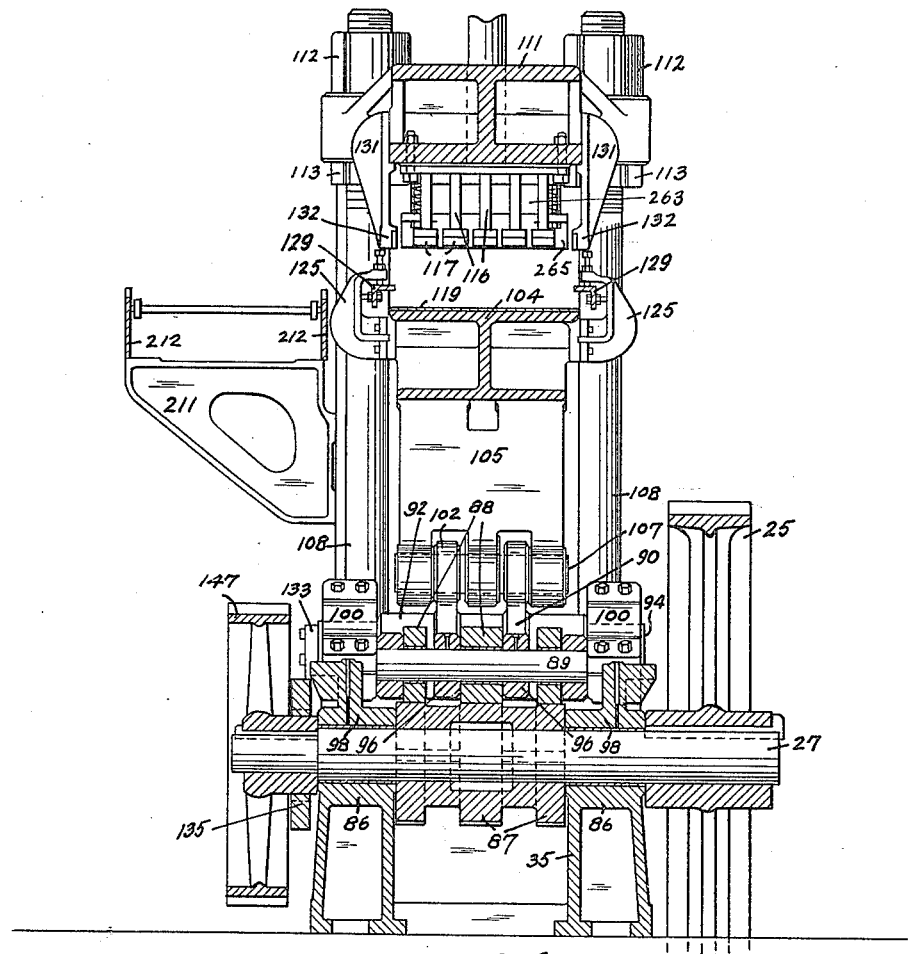
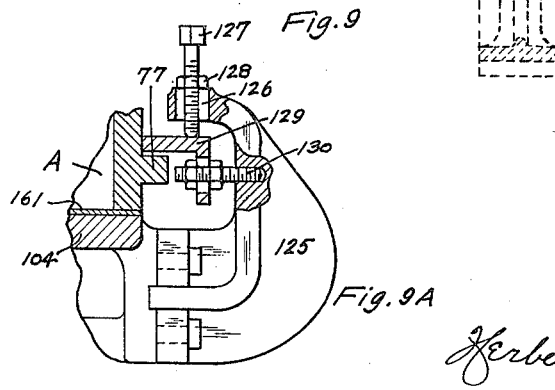
Witnesses
L. W. Frost
A. L. Phelps
Inventor
Herbert N. Kilby
By
C. C. Shepherd, Attorney

H. N. KILBY.
BRICK MANUFACTURE.
APPLICATION FILED JUNE 30, 1913.

1,231,267.

Patented June 26, 1917.
17 SHEETS—SHEET 10.

Witnesses
L. W. Frost
A. L. Phelps

Inventor
Herbert N. Kilby

By
C. Shepherd, Attorney

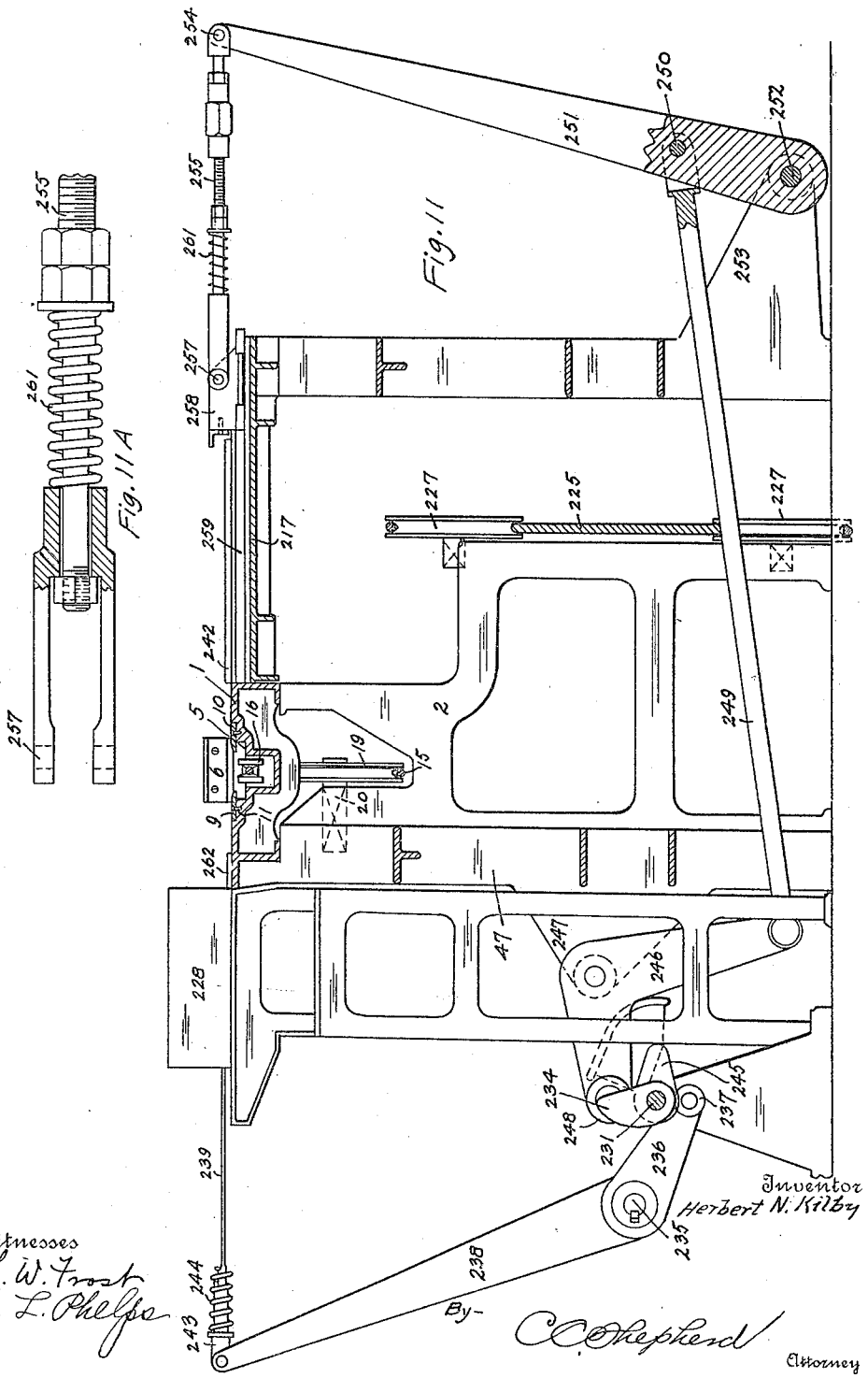

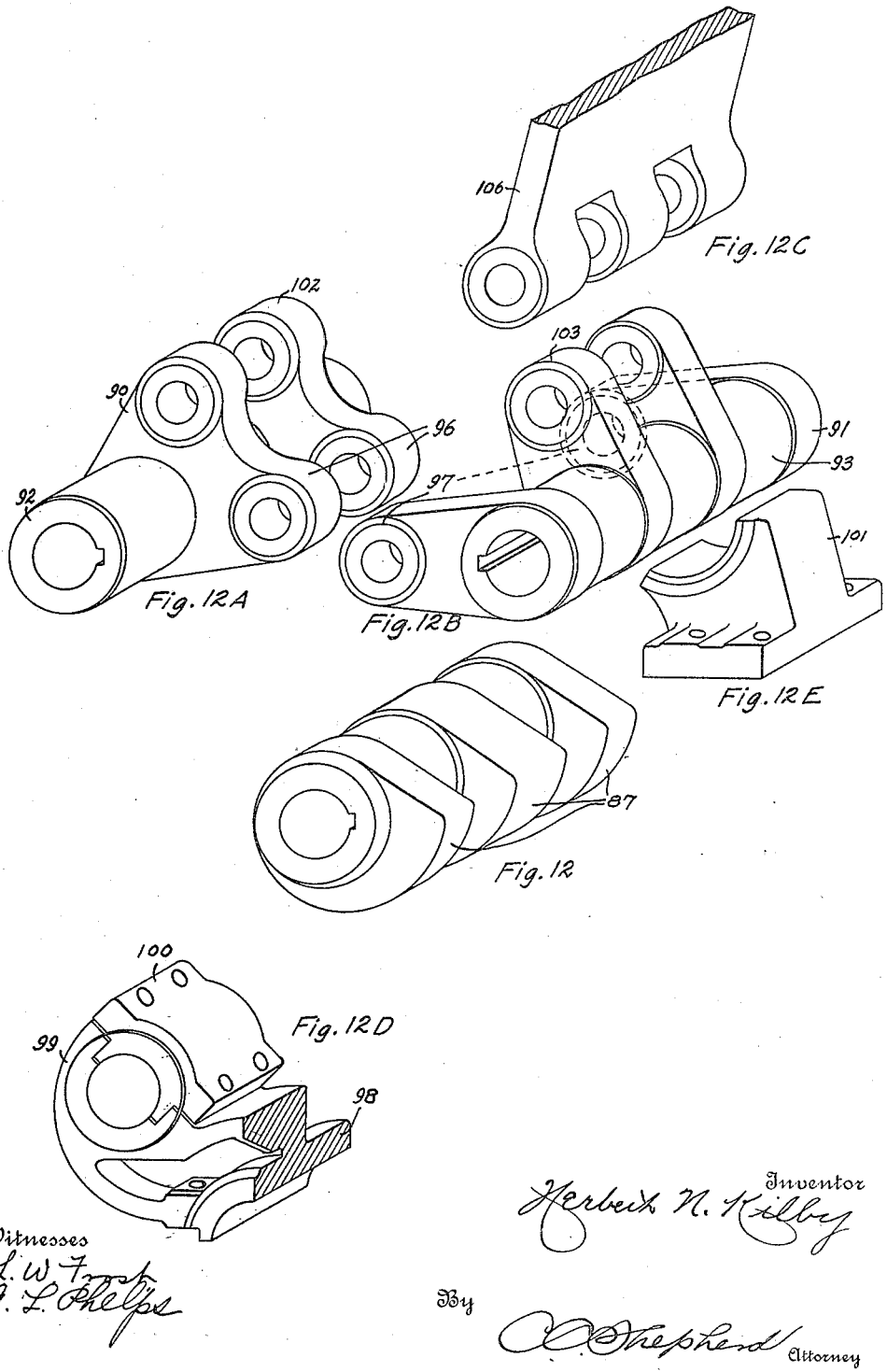

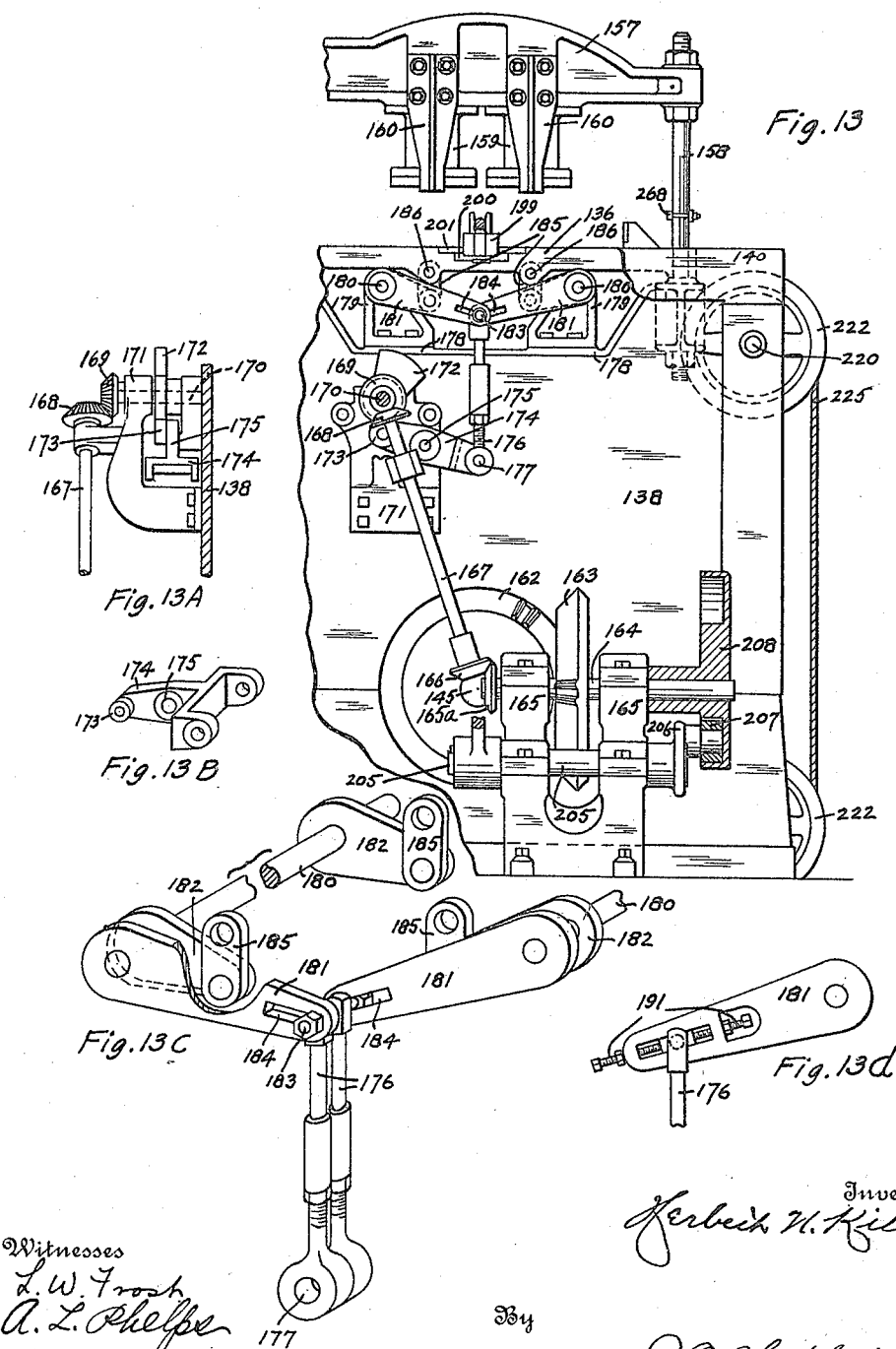

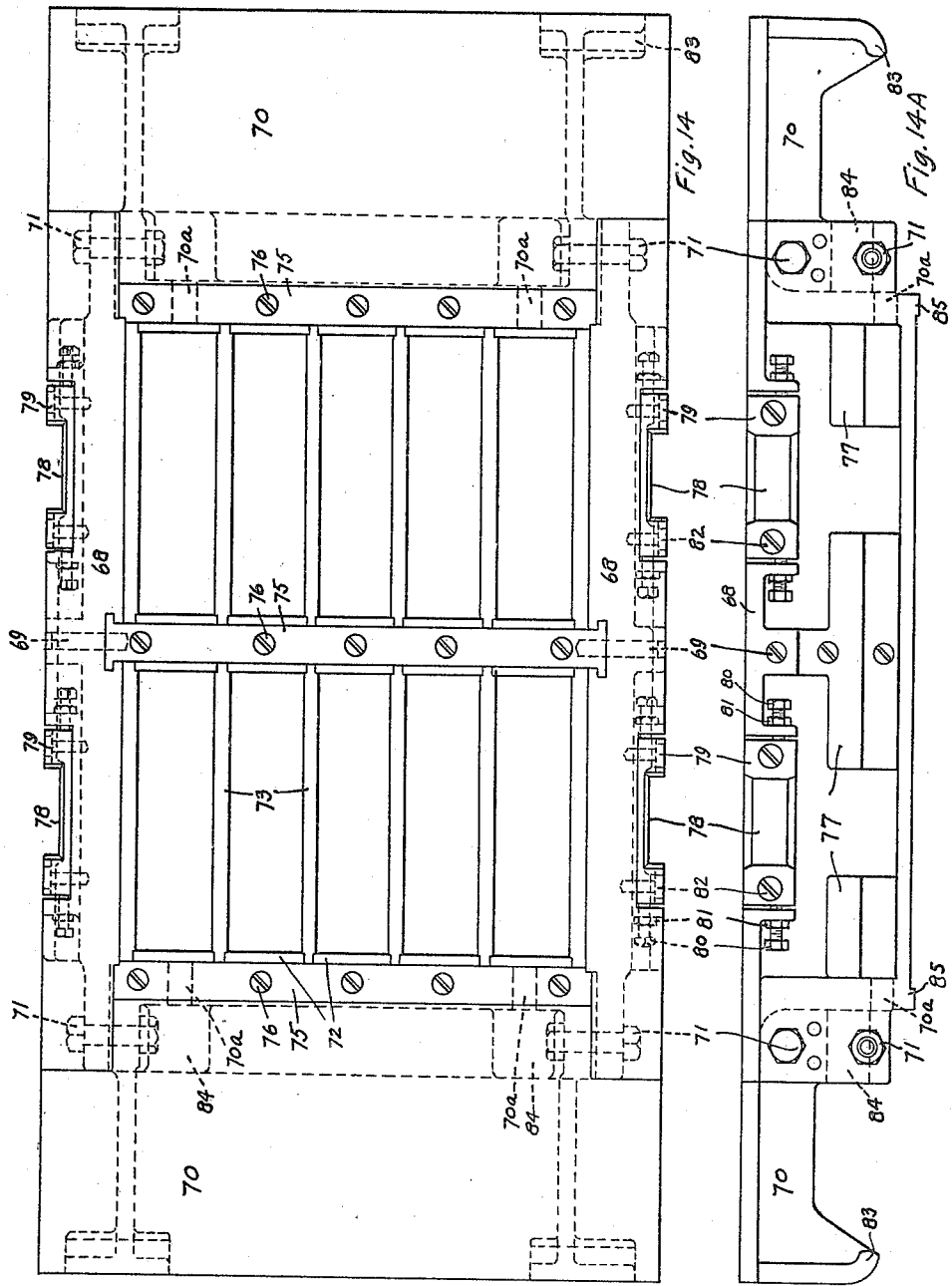

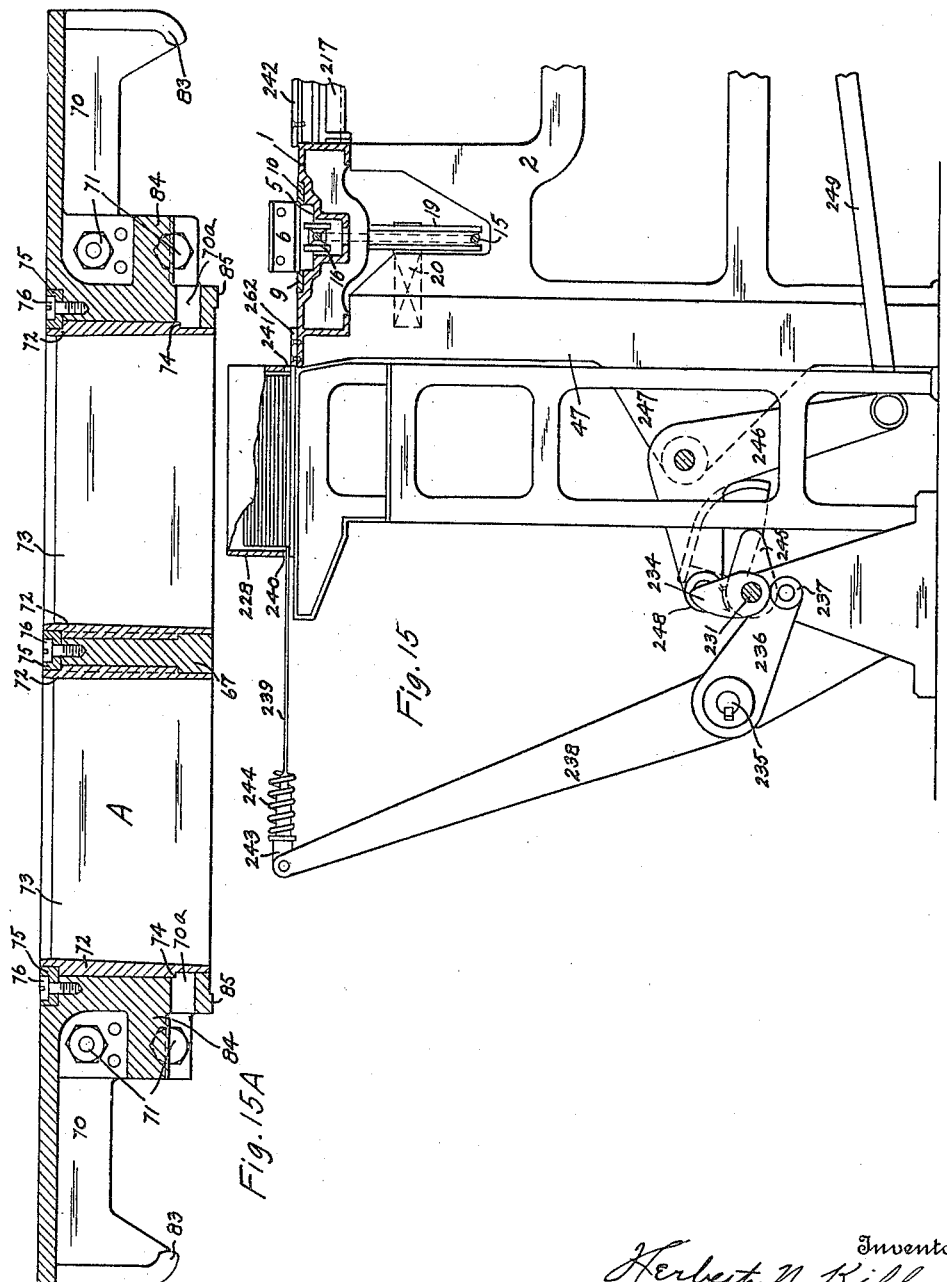

H. N. KILBY.
BRICK MANUFACTURE.
APPLICATION FILED JUNE 30, 1913.
1,231,267.
Patented June 26, 1917.
17 SHEETS—SHEET 16.
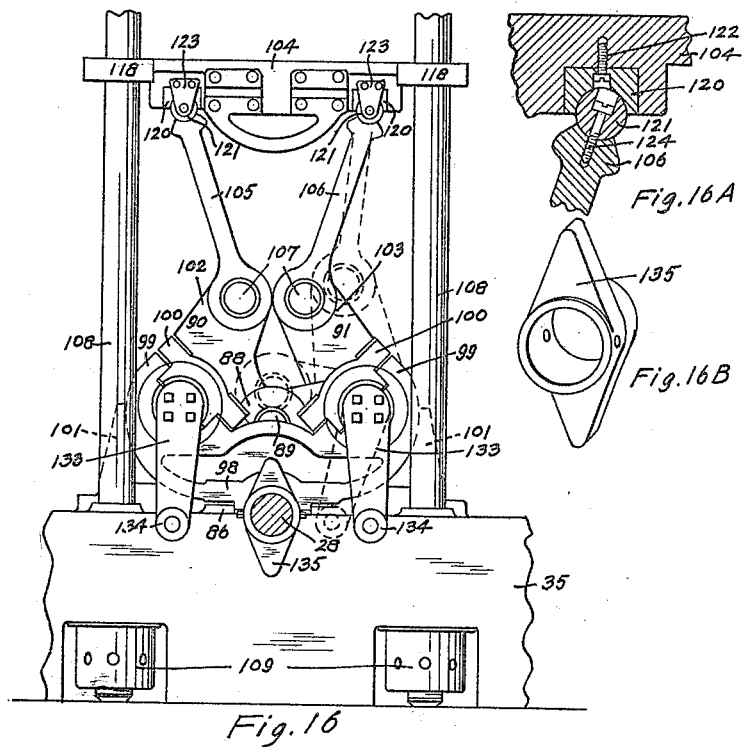
Fig. 16
Fig. 16A
Fig. 16B
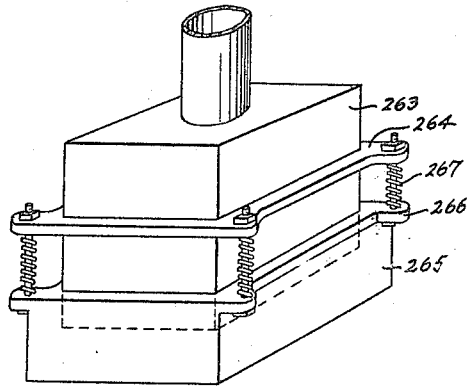
Fig. 16C
Witnesses
L. W. Frost
A. L. Phelps
Inventor
Herbert N. Kilby
By
C. A. Shephard Attorney

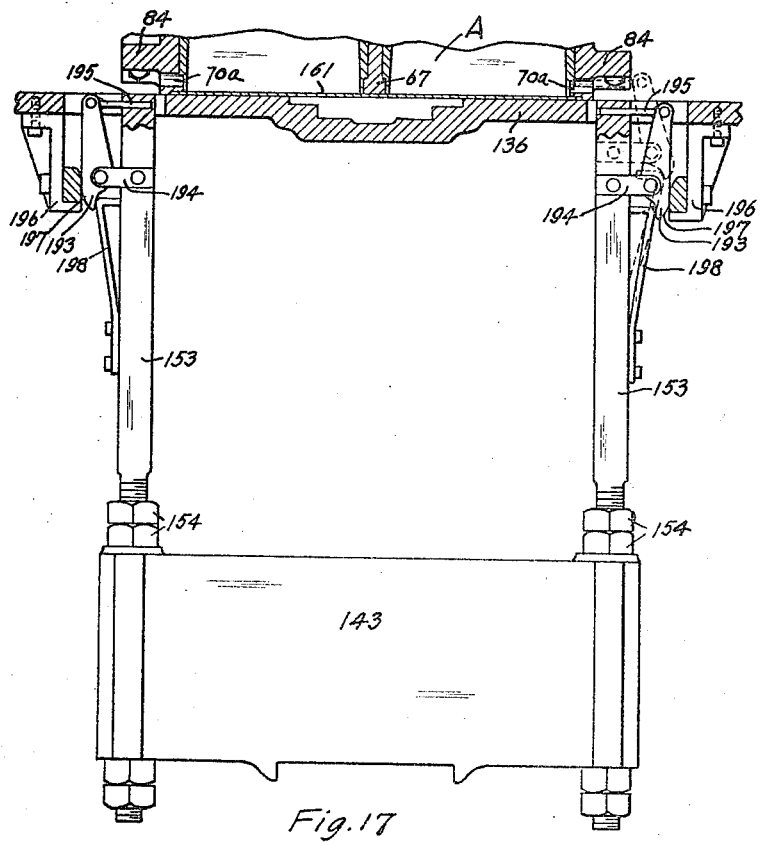

UNITED STATES PATENT OFFICE.

HERBERT N. KILBY, OF CLEVELAND, OHIO, ASSIGNOR TO JOSEPH F. KILBY AND JOHN GEHRING, BOTH OF CLEVELAND, OHIO.

BRICK MANUFACTURE.

1,231,267.  Specification of Letters Patent.  Patented June 26, 1917.

Application filed June 30, 1913.  Serial No. 776,728.

*To all whom it may concern:*

Be it known that I, HERBERT N. KILBY, a citizen of the United States, residing at Cleveland, in the county of Cuyahoga and State of Ohio, have invented certain new and useful Improvements in Brick Manufacture, of which the following is a specification.

My invention relates to the art of brick manufacture and resides essentially in the provision of a machine for accomplishing this end by its operation upon suitable mixtures of sand and lime or other mixtures wherein cement forms one of the principal ingredients. I have found that bricks of a very substantial and efficient nature may be manufactured by performing suitable operations upon such mixtures as cement with pulverized sandstone, shale and, in fact, a great variety of pulverized stone, as well as a suitable mixture of cement with cinders, or asbestos, or mineral wool, etc.

In the art of brick manufacture, one of the principal essentials is to provide a brick wherein the pores are considerably closed to overcome the excessive water absorbent properties. This has hitherto been one of the obstacles preventing the successful manufacture of this type of brick. Experience has demonstrated to me that bricks of the type referred to above, can be manufactured with low moisture absorbing properties by the provision of a suitable mixture subjected to very intense pressure. In my endeavors along this line, I have availed myself of the fact that there is a certain point where the practical limit of compression is reached for the various mixtures. In other words, I have found it desirable to compress the brick forming mixtures up to that point where any additional pressure provides little or no additional compressing of the brick. When this point has been reached, I have found it practically useless, from a commercial standpoint, to create pressures of greater intensities and I have, therefore, endeavored to determine that point of the various mixtures which I have referred to above, as being their compressive limits.

In carrying out the above principle, I have provided a machine to successfully perform this function. Bricks as they are presented to the trade today, are all of what is known as a standard size and it was, therefore, necessary to construct my machine to produce bricks also of a standard size. To do this, I have provided a mold with means for filling the same with a suitable mixture and subsequently compressing this mixture as referred to above. This compressing I do in two separate actions, although it is obvious that any number of compressive actions may be given, if desired. However, by the provision of at least two compressive actions, I have found that I can veneer onto each brick a suitable facing. This is greatly enhanced by the intense pressures used by me. Further, where at least two compressions of the mixture, as well as two fillings are resorted to, which I have shown as one embodiment of my invention, the extent to which the mixture is initially compressed, may be regulated, while the distance between what forms the bottom of each brick and the faces of the dies used in the second compressing action, is always maintained constant. The amount that the initial mixture is compressed, should then be so regulated that the limit of compression of the mixture as a whole, during the second compressing action, is reached. In this manner, the limit of compression of the entire mixture is made to come at that point when the mixture has been compressed to the dimensions of a standard brick.

In the preferred construction of my machine, I provide a plurality of filling actions for each mold and a plurality of compressing actions operating upon the mixtures in the mold, these filling and compressing actions alternating. All of these actions I find desirable to carry on simultaneously where sufficient power is at hand and in this manner, the length of time required in the manufacture of brick, is considerably lessened over when the several operations are carried on at different times. During this simultaneous compressing and filling action, I have also provided a structure for stripping the formed bricks out of their molds and it will, therefore, be apparent that the various steps required in the manufacture of these bricks by my machine, are carried on simultaneously.

Another feature of novelty in my machine, resides in the provision of a structure for making practically the entire operation automatic. I have provided a plurality of mold boxes that are entirely independent of each other, and that are also disconnected from each other. Means are provided for causing these mold boxes to travel automatically in an endless cycle of operation and requiring no attention of any skilled labor. To this end, I have found it necessary to definitely locate the filling, compressing and stripping mechanism apart distances commensurate with the length of each mold box. Where the various operations are carried on simultaneously, one row of mold boxes is moved forward a definite distance after each operation to move them into positions opposite the succeeding operation required. To make the cycle of operation automatic, means must, therefore, be provided for returning each mold box to its starting point and also for feeding each mold box into its line of operation. Structures for accomplishing these ends, have been provided by me.

In the present embodiment of my invention, I have resorted to the use of independent pallets to be placed beneath each mold box, these pallets being in this position during the filling, compressing and stripping operations. These pallets are fed into a position to be ultimately beneath each of the mold boxes by a structure which also preferably is operated automatically. I have also provided a novel type of stripper mechanism, wherein there is provided a surface upon which the stripped brick are adapted to rest after the stripping operation, there being a separation between this table and the mold box during the stripping operation. In this manner, the bricks are prevented from falling down upon the stripper table during the stripping operation and the bricks are further prevented from breaking by being slightly suspended from the mold box before the entire stripping operation is completed.

To increase the utility of my machine, means are also provided for automatically conveying the stripped brick away from the stripping mechanism, as well as returning each mold box to its starting position after the stripping operation, as has been already referred to.

Figure 2:
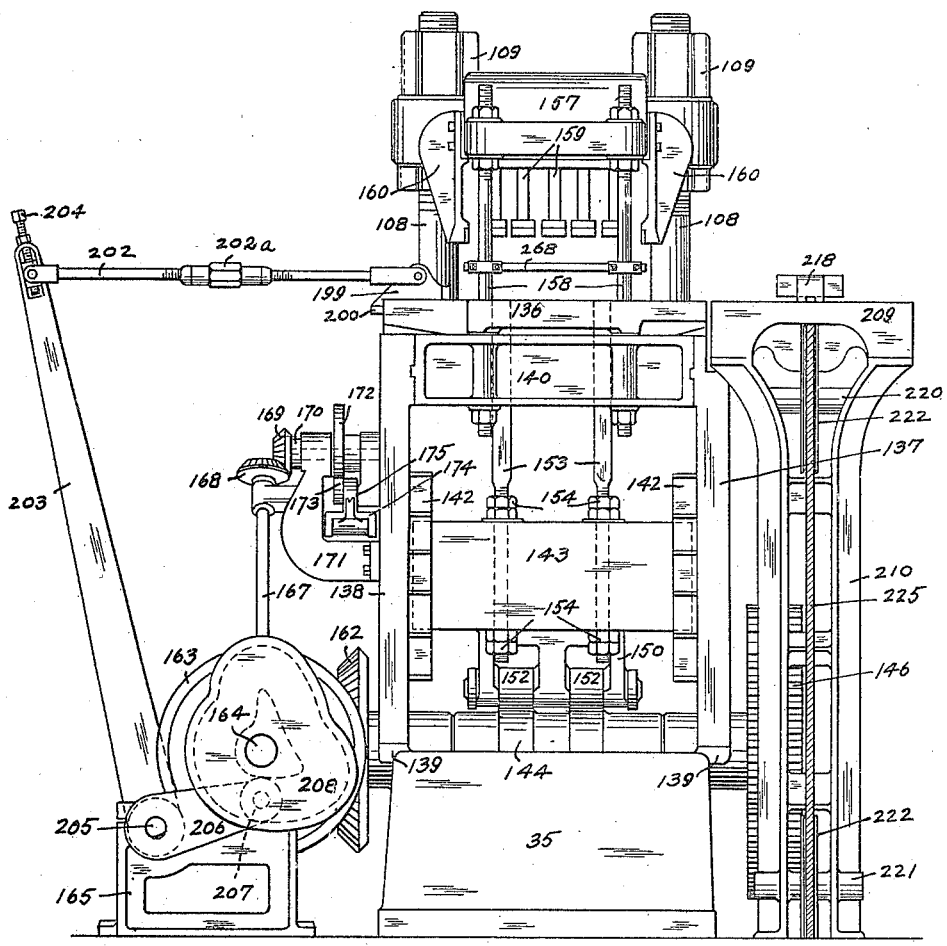
Figure 2B:
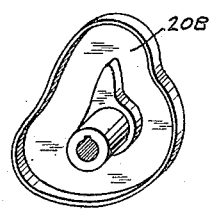
Figure 2A:
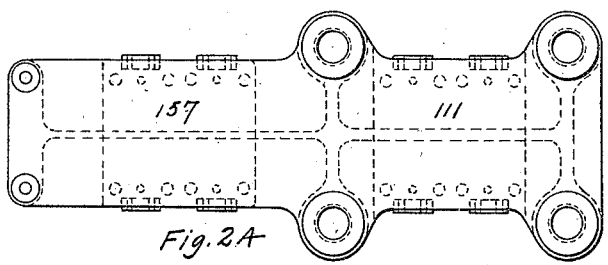
Figure 8:
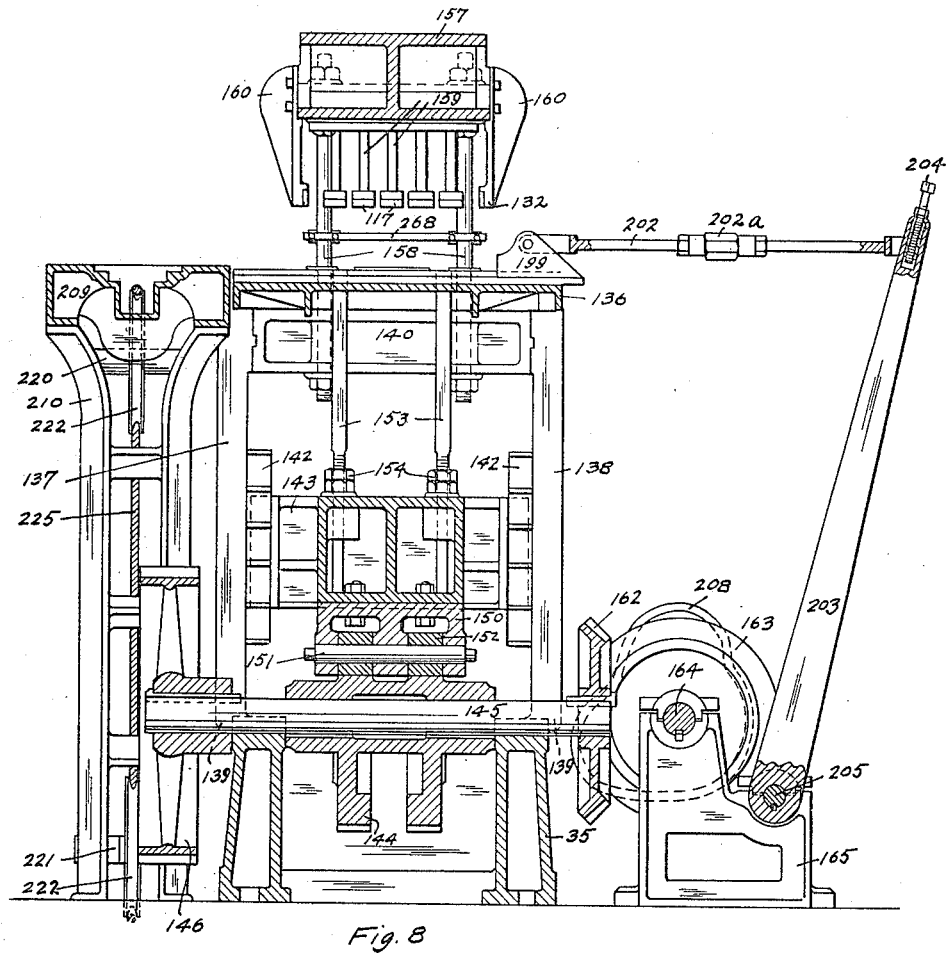
Figure 10:
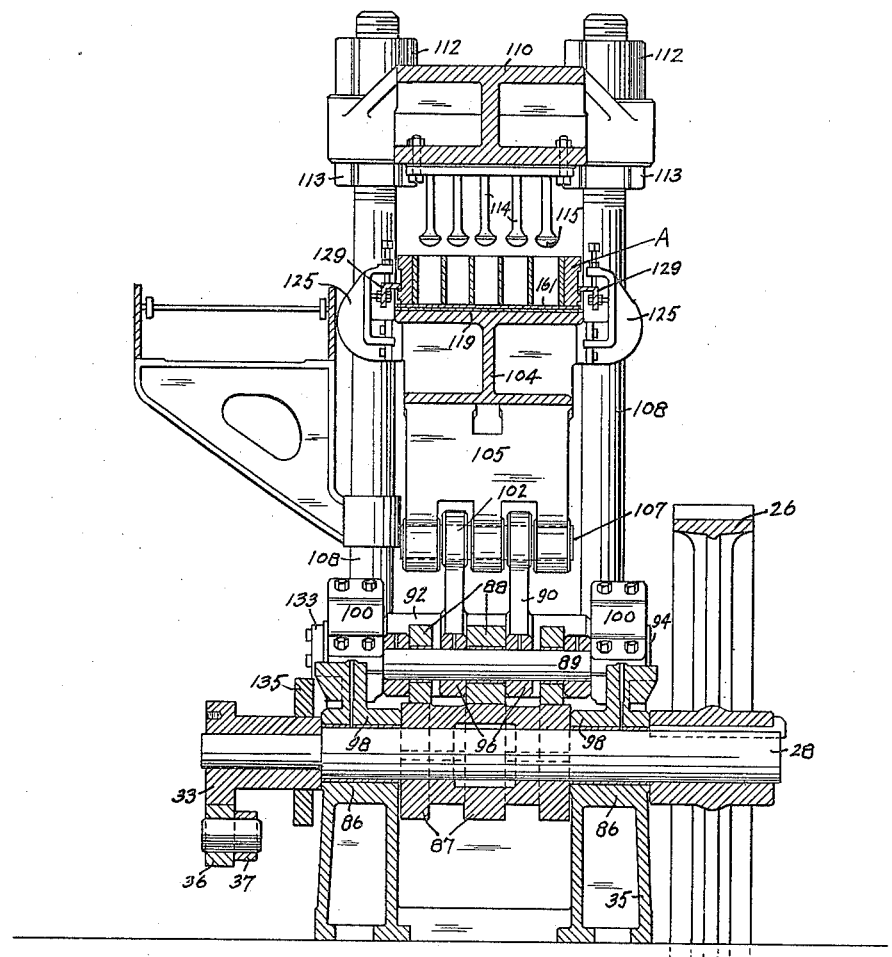
Figure 10A:
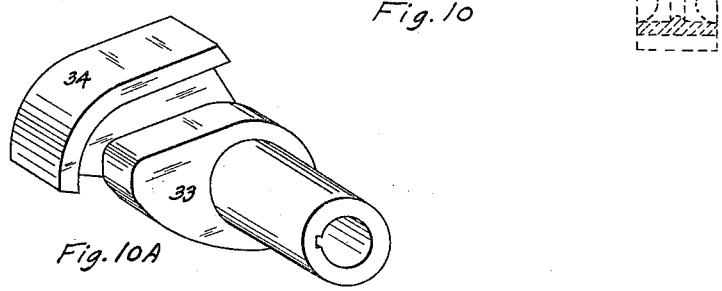

Other features of novelty are contained in my stripping mechanism as well as the compressing structure and the feeding mechanism, as will be apparent from the detailed description of the preferred embodiment of my invention as shown in the accompanying drawings, in which similar characters of reference designate corresponding parts, and in which:

Figure 1 is a side elevation of my assembled machine, the initial operation being performed at the right hand end of the structure and the final operation at the left hand end, Fig. 2 is an enlarged end view of the structure shown in Fig. 1 and looking toward the right, Fig. 2$^A$ is a top plan view of the platen or press head shown at the top left hand end of Fig. 1, Fig. 2$^B$ is a detail perspective of an operating cam shown partly in Fig. 2, Fig. 3 is an enlarged end view of the structure shown in Fig. 1, looking toward the left, and having a portion of the structure broken away, Fig. 3$^A$ is a side elevation of the remaining structure omitted on line s—s of Fig. 3, Fig. 3$^B$ is a cross section taken on line 3$^B$—3$^B$ of Fig. 3 and looking in the direction of the arrows, Fig. 3$^C$ is a side elevation of the type of pusher shown in Fig. 3, Fig. 3$^D$ is a detail perspective of one of the cams shown in Fig. 3, Fig. 4 is an enlarged section on two planes along line 4—5 of Fig. 1 and extending from the left of this figure to the vertical line x—x, Fig. 5 is an enlarged section on two planes along the other half of line 4—5 of Fig. 1 and extending from the vertical line x—x to the right, with a portion of the structure removed along line y—y, Fig. 5$^A$ is a continuation of the structure terminating on line y—y, at lower right hand corner of Fig. 5, Fig. 5$^B$ is a longitudinal detail section of a pusher element shown in plan at the right of Fig. 5, Fig. 5$^C$ is a skeleton plan view of a mold box shown in position at the right of Fig. 1, Fig. 5$^D$ is a perspective of a pallet upon which the mold box shown in Fig. 5$^C$ is adapted to rest, Fig. 6 is a vertical longitudinal section of the assembled machine and taken on line 6—6 of Fig. 4 and looking in the direction of the arrows, Fig. 7 is a continuation of the remainder of the assembled machine shown in Fig. 6 and taken on line 7—7 of Fig. 5 and looking in the direction of the arrows, Fig. 8 is an enlarged section taken on line 8—8 of Fig. 1 and looking in the direction of the arrows, Fig. 8$^A$ is a fragmentary perspective of the stripper cam shown in section in Fig. 8, Fig. 8$^B$ is a perspective of the roller bracket also shown in section in Fig. 8, Fig. 9 is an enlarged section taken on line 9—9 of Fig. 1 and looking in the direction of the arrows, Fig. 9$^A$ is an enlarged detail view of one of the brackets supporting the guide angles for guiding the mold boxes, Fig. 10 is an enlarged section taken on line 10—10 of Fig. 1 and looking in the direction of the arrows, Fig. 10$^A$ is a perspective view of the main transfer cam shown in section at the left of Fig. 10, Fig. 11 is an enlarged section taken on line 11—11 of Fig. 1 and looking in the direction of the arrows, Fig. 11^A is an enlarged detail plan, partially in section, of the pusher rod shown in the upper right hand corner of Fig. 11, Fig. 12 is a perspective view of the assembled press cam, Fig. 12^A is a perspective view of one of the bell cranks forming a portion of the press toggles, Fig. 12^B is a perspective view of another of the bell cranks forming a portion of the press toggles, Fig. 12^C is a partial perspective view of one of the toggle links used with the above bell cranks, Fig. 12^D is a perspective view of half of one of the main shaft cap brackets serving as a fulcrum bearing for the toggle bell cranks, Fig. 12^E is a perspective view of one of the auxiliary bearings for the press bell cranks, Fig. 13 is a detail side elevation of a portion of the stripper mechanism from the opposite side from that shown in Fig. 1 and looking from the line 13—13 of Fig. 4, Fig. 13^A is a side view of the cam supporting bracket projected from Fig. 13, Fig. 13^B is a perspective of the cam lever shown in Fig. 13 and shown detached from the above cam bracket, Fig. 13^C is a perspective of a portion of the mechanism used to elevate the stripper table, Fig. 13^D is a side elevation of a slightly modified form of one of the lever arms shown in Fig. 13^C, Fig. 14 is a detail view plan of the preferred type of mold box used with this structure, Fig. 14^A is a side elevation of the structure shown in Fig. 14, Fig. 15 is a side elevation of the pallet feed mechanism, shown in conjunction with a portion of the remaining structure, Fig. 15^A is a longitudinal vertical section of the mold box shown in Fig. 14, Fig. 16 is a side elevation of one of the press toggles showing a knock-out cam.

Fig. 16^A is a detail section of the connection between the toggles and the press table, Fig. 16^B is a perspective view of the knock-out cam, Fig. 16^C is a perspective view of the dust gathering box, and, Fig. 17 is an enlarged longitudinal section through a portion of the stripper structure, taken on line 17—17 of Fig. 4 and showing this structure slightly enlarged from that shown in Fig. 6.

Before entering upon a detailed description of these drawings, I will state in a general way the operation of my machine. The main feed table is provided with a plurality of abutting mold boxes and these mold boxes are intermittently fed forward to pass from one end of the machine to the other. In so passing, they are successively forced under a feed hopper, then onto a press table, again under a second feed hopper, from there onto another press table and finally, onto a stripper table where the formed bricks are removed from the mold boxes. At the starting and finishing ends of the machine, these mold boxes are also automatically moved into position for forward movement and into position for return movement respectively.

The starting end of the machine, is that end where the mold boxes are initially passed under the first feed hopper. Referring to Fig. 1, I have shown the starting position of one mold box, marked A. It will be understood that the main feed table supports a continuous strand of these mold boxes, but for purposes of description, showing this one is believed to be sufficient. It will be noted that this mold box A rests upon that portion of the main feed table termed the entrance table and designated by the reference numeral 1. This entrance table is bolted in its horizontal position by two vertically extending end pieces designated 2 and 3. The first operation required in the manufacture of brick by my machine, is that of moving the mold box A to a position beneath the first feed box designated in its entirety by the reference numeral 4. To accomplish this, attention is directed to Figs. 1, 5, 7 and 11. It will be noted that this entrance table has its upper surface provided with longitudinal trackways as indicated at 5 in Fig. 11 and that a pusher 6, shown in detail in Fig. 5^B is designed to reciprocate therein. This pusher 6 is provided with an upwardly projecting shoulder 7 adapted to abut the rear edge of the mold box and with horizontally flaring ears 8 adapted to slidingly engage the trackways in the entrance table, upon which it is positively held in position by the superimposition of clamping strips 9 and 10 respectively, these strips being screwed to the entrance table by means of the screws 11.

In order that the forward movement of the mold boxes to a position beneath the feed box 4 may be made automatic, I have provided the pusher 6 with downwardly projecting pierced ears 12 and 13 through which a rod 14, threaded upon both its ends, is adapted to slidingly pass. This rod 14 is attached to an endless cable 15 through suitable couplings 16 and is also provided with a spring 17 bearing against the ear 13 at one end and against adjustable nuts 18 upon the rod at its other end. The endless cable 15, referred to, is adapted to pass over a sheave 19 carried in a suitable bearing 20 upon the end support 2 and also over a suitable sheave 21 carried in a corresponding bearing upon the other entrance table supporting member 3. Intermittent reciprocating motion is imparted to the pusher 6 by means of the endless cable 15 in the following manner from the main driving mechanism, which constitutes the pulley 22 suitably mounted upon a shaft 23 carrying a spur pinion 24. This spur pinion in turn, transmits power to the main gears 25 and 26 mounted upon shafts 27 and 28 respectively, through the train of gearing 29, 30, 31, 32 and 32$^a$, all supported in any desired manner: The near side of the shaft 28 as shown in Fig. 1, is provided with a cam 33 provided with a suitable return guard 34. It will be understood that the shaft 28 is provided with suitable bearings in the bed plate 35 and that the cam 33 operates upon a roller 36 carried upon one end of the cam lever 37 also pivoted to the bed plate 35 at 38. The long arm of this cam lever 37, has its upper end suitably cut out to admit of a slidable bearing 39 held in adjusted position by the set screw 40. An adjustable rod 41 is pivotally connected to the bearing 39, the rod being adjustable in length by means of a turn buckle 42 and having its opposite end pivotally attached to a suitable lever arm 43 rigidly keyed upon a shaft 44. This shaft 44 is journaled as at 45 in suitable bearings upon upwardly extending supporting members 46 and 47, the latter extending up beneath the entrance table as shown in Figs. 7 and 3 and the former, as shown in Figs. 1 and 3, being designed to support a cross feed table to be hereinafter referred to. It will, therefore, be apparent that rotation of the main shaft 28 will cause the cam 33 to depress one arm of the cam lever 37, thereby causing a partial oscillation of the shaft 44 through the medium of the connecting rod 41 and the lever arm 43. Suitably mounted upon the shaft 44 are two double-grooved quadrants, the one designated 48 being in longitudinal alinement with the sheaves 19 and 21. The hub of the quadrant 48 is also provided with two outwardly projecting lugs 49 to which are pivotally attached rods 50 and 51, whose opposite ends are connected to the terminations of the cable 15, whereby this cable is made endless. It will also be noted that both of these rods 50 and 51 are adjustable in length by means of the turn buckles 52. Therefore, oscillation of the shaft 44, as previously described, will cause an oscillation of the quadrant 48 through approximately ninety degrees, whereby the endless cable 15 causes the pusher 6 to reciprocate longitudinally upon the entrance table 1, thereby forcing the mold box A to a position beneath the feed box 4.

It will be noted that the entrance table 1 extends forward to a position slightly beyond the first feed box 4. This feed box 4 is similar to a corresponding feed box 4$^a$ mounted somewhat farther on upon the machine, each comprising an upper hopper portion 53 having an open top and provided with angles 54 to serve as a ready means of attachment to a suitable chute. To the underside of each of the hopper portions 53, there is provided a suitable filler box 55, whose under surface is open and is determinately spaced from the upper working surface of the feed table by means of the bracket arms 56 suitably attached to the sides of the feed table, as shown more distinctly in Figs. 1 and 7. The rear wall of each of these filler boxes 55, is also chamfered as indicated at 57, to cause a slight wedging action of the mixture into the mold box as the same is passed therebeneath. In order to prevent clogging of the mixture while in the filler box, I have provided two shafts 58 and 59, these shafts being each provided with radially extending pins 60 adapted to pass each other, as clearly shown in Figs. 4 and 5. The shafts 59 are provided with sprockets 61 which are driven by sprocket chains 62 receiving their motion from any desired source, while the opposite ends of both the shafts 58 and 59 are provided with meshing gear wheels 63. The distance between the undersides of the filler boxes and the feed table is such as to slidingly permit the passage of the mold boxes therethrough. To insure the correct travel of the mold boxes thereunder, I have provided the guide angles 64 adjustably supported upon the brackets 56 by means of set screws 65 and 66. The detailed construction permitting of this adjustment, will be hereinafter described when referring to Fig. 9$^A$. After the mold boxes have been initially filled by passing under the feed device 4, they are again moved to a further position opposite the compressing structure.

As has been previously related, there are also provided two structures for compressing the mixture. By referring to Figs. 14, 14$^A$ and 15$^A$, it will be noted that my mold boxes are made with ten brick openings. Each box is built-up of one central piece 67, two side pieces 68 secured to the central piece by means of the screws 69, and two end pieces or aprons 70. It will be noted that the side pieces 68 are secured to the aprons 70 by bolt and nut structures 71 and that a plurality of liners 72 and dividing members 73, respectively, are provided to divide the box as a whole, into the required number of openings. These liners and dividing members are each provided with shoulders 74 as indicated in Fig. 15$^A$, which coact with complemental shoulders upon their abutting structures to limit their downward movement and are held in place against upward movement by locking strips 75, held in place by screws 76 engaging similar shoulders at their upper ends. Both of the side pieces 68 are also provided with outwardly projecting lugs 77 finished to coöperate with the guide angles 64 previously referred to. Each of the side members 68 is also provided with vertical guideways 78 formed by individual guide members 79 suitably secured in cutout portions on the outside faces of the side members. These guide members are adjustable within small limits by means of set screws 80 carrying lock nuts 81 and are positively held in adjusted position by the locking screws 82. The aprons 70 are of a width to give the box structure a predetermined length over all, for a purpose to be hereinafter referred to and are also each provided with downwardly projecting guide shoulders 83, whose lower edges are slightly turned under. Each of the aprons 70 is also provided with two bosses 84 for a purpose to be also hereinafter referred to. Centrally disposed with respect to these bosses 84 and within and through the end walls adjacent the molds themselves of the aprons 70, are longitudinal holes 70ª, the approximate location of which can be determined from the dotted line showings in Figs. 14 and 14ᴀ. These holes are also for a purpose to be hereinafter described.

It will be noted that I have made the walls of the various openings for the brick removable so that they may be removed whenever it is desired to replace them. Reference to Fig. 15ᴀ will also show that the end liners 72 are also slightly tapered outwardly from the upper side of the box to its lower side. This is made so, to eliminate as much as possible the sliding of the end walls of the formed brick upon the metal liners during the time these formed bricks are stripped out of their forms. The underside of each of the mold boxes is also provided with lips 85 to engage pallets normally carried during the normal passage through the machine.

As has been previously related, there are provided two structures for giving the mixture fed to the mold boxes in passing under the feed hoppers 4 and 4ª, two compressions. These structures are substantially identical and the following description of this operation of my machine, will be directed to both of these structures, their structural differences being specifically pointed out.

The bed plate designated 35 extends from the first press structure at the right of the machine over to the extreme left hand end and it will be understood that it is suitably designed for weight and strength. This bed plate is also provided with suitable bearings 86 upon each side, Fig. 10, for the shafts 27 and 28, these shafts carrying three cams 87, preferably formed integral. It will be noted that these cams are located to rest in the bed plate between each of the bearings 86 and coact with three separate rollers 88 carried upon the roller shaft 89. These cams and rollers are designed to operate the toggles, which will now be described. Referring particularly to Sheet 12, and also to Figs. 6, 7 and 10, it will be noted that each toggle is formed by a bell crank at its lower end and a complemental connecting link at its upper end. The bell cranks 90 91, shown in detail in Figs. 12ᴀ and 12ᴮ, respectively, are each provided with bushings 92 and 93 designed to be rigidly mounted upon shafts 94 and 95. The horizontally disposed arms of each of these bell cranks carry bearings 96 and 97 for the reception of the shafts 89, the rollers 88 being suitably spaced to coact with the cams 87 before referred to. The manner of rigidly supporting these bell cranks upon the bed plate is as follows: Referring particularly to Fig. 12ᴰ, which shows a perspective of half of one of the main shaft cap brackets, it will be seen that the bearing portion 98 is designed to fit over and securely hold the shaft 28 in its position upon the bed plate. The position of these cap brackets is more apparent by reference to Fig. 10. Integrally formed upon the cap portion 98 and extending upwardly upon each side at an incline is a supplemental bearing portion 99 provided with caps 100. The bearings formed by the portions 99 and 100 are adapted to embrace the bushing portions 92 and 93 of each of the bell cranks 90 and 91, respectively. By suitably bolting the main shaft cap brackets into their positions upon the bed plate, it will be apparent that both of the bell cranks are rigidly held in their operative position, as indicated in the drawings. I have also provided auxiliary bearings 101, shown in detail in Fig. 12ᴱ, adapted to support only the under portions of the center portion of each of the bell cranks 90 and 91. These auxiliary bearings are also suitably bolted upon the bed plate and prevent bending or breaking of the bell cranks at their center portions.

The upwardly inclined arms 102 and 103 of each of the bell cranks are designed to pivotally connect a movable table structure 104 through the medium of the toggle links 105 and 106. Reference to Figs. 6, 7 and 10 will clearly indicate the manner of connecting these links with the bell cranks by means of the transverse rods 107.

Extending upwardly from the bed plate 35, are a plurality of posts 108 suitably held in position thereon by nuts 109 and carrying at their upper ends, platens or press heads. The press head 110 at the right of the machine, is slightly different from the press head 111 shown at the left of the machine, but are designed to operate in substantially the same manner. Both of these press heads are secured to the posts 108 by means of the double nut structure 112 and 113, whereby it will be apparent that adjustment of these platens or press heads vertically, may be very readily had. Both the press heads 110 and 111 are designed to carry a suitable number of dies, those designated 114 on the press head 110 having an oval bottom 115, while the dies 116 carried by the press head 111 are each provided with smooth flat plates 117. Both sets of dies 114 and 116 are removable in case of breakage, but are adapted to be positively held in the positions shown when in actual operation.

The upwardly movable tables 104 are provided with ears 118 adapted to slide upon the posts 108 and as a result, they are positively guided in their upward movement under the control of the toggles. Each press table has its upper surface provided with a wearing strip 119, upon which the mold boxes are adapted to slide after passing from under the feed hoppers 4 and 4ª. Each press table is also provided with two bearing blocks 120, Fig. 16ᴬ, to serve as supports for transverse shafts 121 carried by the upper ends of each of the toggle links 105 and 106. Each of the bearing blocks 120 is held in position upon its press table by countersunk machine screws 122, while the transverse shafts 121 are held in the position shown in Fig. 16ᴬ by their pivotal connections with pendents 123, Fig. 16, also rigidly attached to each press table. In order that the toggle links may not accidentally become dislodged, the shafts 121 are also attached thereto by means of the countersunk head machine screws 124. It will be noted that this structure permits of an oscillatory movement of the shafts 121 within their respective bearing blocks 120.

After the mold boxes have been placed in their positions upon the press tables, it being carried in mind that the mold openings have been filled with a suitable mixture, it is aimed to elevate these press tables 104 to compress the mixture between the under surfaces of the dies 114 and 116 and the top of the press table. This upward movement is accomplished in the following manner: The main gears 25 and 26 carried by the shafts 27 and 28, respectively, are continually in motion and also travel at the same speed. Consequently, their rotation in the direction of the arrows shown in Figs. 6 and 7, will cause the cams 87 to elevate each of the press tables 104 by their engagement with the rollers 88. Elevation of these rollers, causes oscillation of each of the bell cranks about their shafts 94 and 95, which in turn, causes a straightening out of each of the toggles. By this action, each mold box is in turn moved toward the dies 114 and 116, whereby the mixture contained therein, will be compressed to a high degree. In actual practice, the initial compression may be regulated by the vertical adjustment of the press head 110, this adjustment being such that the final compression by the engagement with the dies carried by the press head 111, will compress the mixture within the mold box to its compressive limit as described in the fore part of this specification.

In so moving the mold boxes into their positions upon the press tables, it is desirable to positively guide them and to this end, I have provided each press table with bracket arms 125, shown in detail in Fig. 9ᴬ, these bracket arms being disposed two upon each side of each of the press tables. They are designed to have slotted head pieces 126 through which are passed set screws 127 locked in position by nuts 128. These set screws engage the horizontal legs of guide angles 129 which are permitted vertical adjustment by their slotted engagement with bolts 130 passing through their vertical legs. It will, therefore, be apparent that these angles are permitted vertical adjustment and also a horizontal adjustment by their slotted connection at 126 and that they may, therefore, be regulated to any desired degree to engage the outwardly projecting lugs 77 carried upon each side of each mold box. It will, therefore, be apparent how these mold boxes are guided in their horizontal movement.

The press head 111 is provided upon each side with two depending guide brackets 131, the lower foot pieces 132 of which are designed to engage the guideways 78 of each of the mold boxes to positively guide them in their upward movement while moving toward the dies 116. It will be noted that the dies 116 have the sharp flat under plates 117 and it is, therefore, essential that the mold boxes be positively guided into their engaging position, while the dies 114 have the oval shaped under surfaces 115 which will automatically cause the mold boxes to center themselves should they be slightly out of true.

In order that each of the press tables 104 may be positively returned to its initial position after each compressing action, I have provided each of the shafts 94 and 95 with a knock-out lever 133 carrying a roller 134 at its lower end, Fig. 16, particularly, and Figs. 1, 9 and 10. These rollers 134 are adapted to engage the cams 135 carried upon the near side ends of the shafts 27 and 28, as shown in Fig. 1. In Fig. 16, I have shown in dash lines the position of one of the toggles when the press table is at its limit of vertical movement. This figure also shows the position of the knock-out lever 133 when the toggle is straightened out, from which the action of the cam 135 will be apparent.

After each mold box has been subjected to the second compressing operation by the elevation of the press table 104 against the dies 116 and after the return of this second press table to its lowered position, the row of mold boxes are again pushed forward under the impulse of the pusher 6, whereby the mold box A is pushed onto a stripper table 136. During the entire movement of the mold box to the present position, it is understood that it rests upon a pallet shown in Fig. 5D, this pallet being held in position by engaging the lips 85 on the mold box. The operations performed upon the mold box when opposite the stripping mechanism is as follows: A stripper cross head is elevated, engaging the mold box and forcing it against the stripper dies. During this elevating action of the mold box, the pallet is left upon the stripper table, but at approximately the time the formed bricks are being stripped, the stripper table is also elevated to move the pallet to a position directly beneath the mold box to receive the brick. As the stripping action continues, the stripper table is again lowered in unison with this stripping action and thereby prevents the bricks from dropping upon the pallet, or from breaking while being stripped out of the mold boxes. After the mold box has been forced the required distance against the stripper dies, it is positively held in its elevated position until the pallet carrying the stripped brick, is pushed to one side. After this action, the mold box is lowered to rest upon the stripper table and subsequently forced off of the same, and during this action, it forces the pallet carrying the brick still farther away.

Figures 8A, 8B:
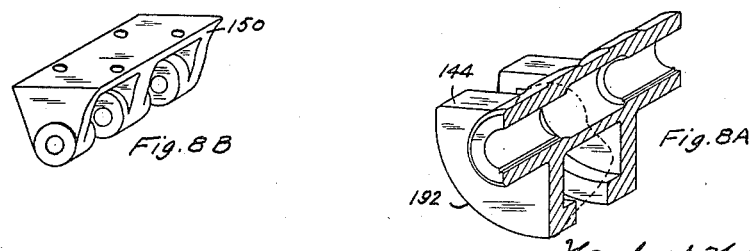

In carrying out the above operation, I have fitted the stripper end of the machine with two side plates 137 and 138, referring particularly to Figs. 2, 4, 6 and 8, it being noted that Figs. 2 and 8 are looking in opposite directions. These side plates are securely bolted to outwardly projecting ears 139 carried upon the upper edge of the base plate 35 and being provided with cross ties 140 and 141 at their upper corners. Both of these side plates have also integrally formed upon them, trackways 142 for the slidable reception of a stripper cross head 143, movable under the control of the stripper cams 144. These stripper cams are partially shown in perspective in Fig. 8A and are rigidly mounted upon a shaft 145 carrying a gear 146 at one end, shown in Figs. 1 and 8. This gear 146 receives its motion from a gear 147 mounted on the near side end of the shaft 27 as shown in Fig. 1, by means of the interposed pinion 148 carried upon a stub shaft 149, carried in any desired manner upon the bed plate 35. The stripper cross head 143 has bolted to its underside a bracket 150 shown in detail in Fig. 8B, which bracket is bored to receive a shaft 151 carrying rollers 152, which rollers are adapted to ride upon the working surface of the stripper cams 144. The stripper cross head is further adjustably provided with four upwardly extending posts 153, these posts being more clearly shown in Figs. 6 and 8, as held in position by a plurality of nuts 154. When the stripper cross head is in its lowermost position, as shown in these figures, these posts 154 lie approximately flush with the upper surface of the stripper table 136, being designed to fit and pass through suitable apertures 155 formed therein and shown particularly in Fig. 4. Further reference to Fig. 4, will show that the stripper table is provided at one end with a tongue 156 adapted to slidingly fit within a correspondingly shaped pocket in the left hand press table 104.

Integrally formed upon the press head 111, shown particularly in Fig. 6, is the stripper platen or head 157. Owing to this integral formation, this stripper head receives its support from certain of the posts 118, it being also supported by the cross tie 140 through the medium of the short posts 158, these posts 158 passing through bearings in the outside end of the stripper table 136 to permit of its upward movement. The stripper head 157 also carries dies 159 similar in substantially all respects with the dies 116 carried upon the press head 11, as well as the guide brackets 160, these guide brackets operating in the same manner as the guide brackets 131. From the description of the stripper mechanism thus far given, it will be apparent that rotation of the cam 144 will cause an elevation of the stripper cross head 143 carrying posts 153, these posts passing through the stripper table 136 and engaging the bosses 84 formed on each of the aprons 70 of the mold boxes, thereby forcing them upward against the stripper dies 159.

The next step, that of elevating the stripper table itself, carrying the pallet 161, Fig. 5D, to a position directly beneath the mold box at the beginning of the stripping operation, is as follows: The shaft 145 carries a bevel gear 162 at the end opposite the gear 146, reference being had to Figs. 2, 4, 8 and 13. This bevel gear 162 meshes with a complemental gear 163 carried upon a counter shaft 164 which counter shaft is mounted on two suitable standards 165. Referring particularly to Fig. 13, which shows the operating structure from the opposite side from that shown in Fig. 6, it will be noted that this shaft 164 also carries a similar bevel gear 165a meshing with a complemental pinion 166. This pinion 166 rotates a shaft 167 suitably journaled upon the outside surface of the side plate 138 and carrying a similar bevel gear 168 at its upper end. This latter gear meshes with a bevel pinion 169 carried by a shaft 170 suitably journaled in a side bracket 171 also shown in Fig. 13ᴬ and being carried by the side plate 138. Between the two bearing points provided by the bracket 171 for the shaft 170, is a cam 172 rotatable in the path of a roller 173 carried at one end of a lever arm 174, Fig. 13ᴮ, fulcrumed at substantially its center 175 upon another portion of the bracket 171. The opposite end of the lever 174 is bifurcated to pivotally engage the adjustable rods 176 at 177, Fig. 13ᶜ. Both the side plates 137 and 138 have their upper edges slightly cut down and provided with flanges 178 upon each of which are bolted two brackets 179. Each of these brackets is provided with a bearing for the shafts 180 to which are keyed the long lever arms 181 and also the short lever arms 182. The long lever arms 181 are entirely independent of each other, and each is under the control of one of the rods 176 adjustably attached thereto by means of the bolt and nut structure 183 slidable in the slots 184. Each of the short levers 182 pivotally carries links 185, which links are in turn pivotally connected at 186 to the underside of the stripper table 136, clearly shown in Figs. 6 and 13. Thus, it will be apparent that after the mold box has been slightly elevated by the elevation of the stripper cross head 143, the stripper table 136 is also caused to be elevated by the further rotation of the shaft 145 imparting motion to the shaft 167 by means of the bevel gears 162, 163, 165ᵃ and 166. Motion from this point is transmitted through the two bevel gears 168 and 169 to the cam 172 which causes depression of one end of the lever 174 and an elevation of its opposite end, thereby elevating the rods 176 and the stripper table itself through the medium of the links 185 and the lever arms 182 carried upon the shafts 180.

This elevating action of the stripper table is to move the same, carrying the pallet 161, into a position directly beneath the elevated mold box to receive the brick in the stripping operation. However, as soon as the bricks again touch the pallet on the stripper table, this table again lowers to its initial position, being guided by the posts 158 and the tongue 156 engaging the pocket in the press table 104. To further give a guiding action, I have provided the stripper table with two depending auxiliary bearings 187, Fig. 6, designed to slide upon guide shafts 188 carried upon lug formations 189 integrally formed upon the cross stay 141. To further insure the return of the stripper table to a perfectly horizontal position, I have provided each of the cross stays 140 and 141 with set screws 190 whereby the stripper table may be positively made to assume its correct position upon its return.

The lever arm, as shown in Fig. 13ᴰ is a slight modification from that shown in Fig. 13ᶜ, the difference being that the rod 176 connecting thereto, is positively held in any adjusted position by means of the set screws 191.

After the mold boxes have been elevated against the stripper dies 159 and the formed bricks stripped out, it is aimed to maintain the mold box in its elevated position a sufficient time to permit of the removal of the stripped brick. The length of time that the mold box is held elevated is represented by the idle portions 192 of the stripper cams 144, Fig. 6. The return of the stripper cross head is apparent from the shape of these cams, but there is a possibility of the mold box remaining upon the stripper dies after the cross head is lowered. To guard against this, I have provided positive means for returning the mold box, this means being particularly exemplified in Fig. 17, and also in Figs. 4 and 6. Each of the posts 153 is provided with a trigger 193 pivoted intermediate its ends by means of the hinge member 194. Each of these triggers loosely pivotally carries a pin 195 passing through a complemental aperture in the upper ends of each of the posts 153. The stripper table is equipped with four depending brackets 196 designed to coöperate with the cam portion 197 of these trigger members in the following manner: When the stripper cross head 143 is elevated, the posts 153 engage the bosses 84 upon the mold box to elevate it as has been previously recited. It will be noted that, in this position, the pins 195 are directly opposite the apertures 70ᵃ, also in the mold box. In this position, the pins 195 are forced into the apertures 70ᵃ by the action of the springs 198 and it will, therefore, be apparent that the mold box is positively held in its position upon the four posts 153 and consequently, upon return of the cross head 143, this mold box will also be positively returned. However, as the posts 153 are lowered, the cam portions 197 of the triggers 193 engage the brackets 196 in the manner shown in Fig. 17, whereby the mold box is again automatically released to permit a further movement.

During the time that the mold box is held in its position upon the stripper dies 159, and after the pallet upon the table 136, carrying the formed brick, is returned to the position indicated in Fig. 6, the following operation takes place: A pusher element is moved against the pallet to transfer it to a position to one side of the machine. After the pusher has moved the pallet sidewise, it again returns to its initial position, whereupon the mold box again returns to the stripper table as has been previously related. Upon the return of the mold box to this position, this same pusher again becomes effective to push the mold box sidewise in the same direction as previously applied to the pallet. These means are accomplished in the following manner: The stripper table 136 is grooved to form trackways for a pusher 199. This pusher is similar to the pushers shown in Figs. 3ᴮ and 3ᶜ and from inspection of Fig. 6, it will be noted that the ears 200 upon this pusher, are adapted to slide in the lowermost groove and are positively held in place by the retaining strips 201. Pivotally connected to this pusher is a connecting rod 202 adjustable in length by a turn-buckle fitting 202ᵃ. Referring particularly to Fig. 2, it will be seen that this rod 202 is pivotally attached to a lever arm 203 through the means of an adjustable connection under control of a set screw 204. The lever arm 203 is rigidly connected to a shaft 205, suitably journaled in the arms of the bracket 165, reference being had particularly to Figs. 2, 8 and 13. Opposite the end to which the lever 203 is connected, the shaft 205 carries an arm 206 upon the end of which is mounted a roller 207. This roller 207 operates in the trackway formed within the cam 208 carried upon the shaft 164 on the end opposite that on which the gears 163 and 165ᵃ are carried. Power is transmitted to this cam 208 by means of the bevel gears 162 and 163 as has been before described. This is also clearly shown in Fig. 4. From the shape of the cam 208, it will be apparent just how the pusher 199 is given two reciprocations, the first one to move the pallet from beneath the stripper dies and the second, to move the mold box from a position beneath the stripper dies.

The second reciprocation of the pusher 199 causes the mold box to be moved upon the entrance portion 209 of the return table structure. Referring to Figs. 1, 2 and 4, it will be noted that this entrance portion 209 of the return table structure, is supported at its extreme end upon an upwardly extending standard 210 and farther on is supported upon the side plate 137 through the medium of the outwardly projecting bracket 211. To the end of the entrance portion 209 are attached two side pieces 212 suitably notched as at 213 to carry roller shafts 214 upon which are mounted the rollers 215. These side pieces 212 are further supported by a bracket 216 carried by one of the posts 108 and upon the standard 3, slightly beyond which they are again bolted to a cross feed table 217. Reference to Fig. 4, will disclose that the entrance portion 209 of the return feed table is also grooved to receive a pusher 218 slidable therein and being held in position by strips 219. The manner of mounting this pusher is similar to the two pushers already described, and particularly the description of the pushers shown in Fig. 5ᴮ. The support 210 is also provided with two bearing portions 220 and 221 to receive shafts carrying sheaves 222. Upon the bracket 216 carried by one of the posts 108, Fig. 1, there is also provided a bearing portion 223 carrying an idle sheave 224. The pusher 218 is connected to an endless cable 225 in the same manner as the connection illustrated in Fig. 5ᴮ. This endless cable passes about the two sheaves 222 upon the left hand end of the machine, over the idle sheave 224 and is secured to a quadrant 226 also carried by the shaft 44. The location of this quadrant will be very apparent by reference to Fig. 3 and the manner in which the cable is connected thereto is the same as the connection illustrated for the quadrant 48 illustrated in Fig. 7. The opposite end of the cable is also connected to the quadrant 226 in the same manner as the cable connections illustrated in Fig. 7 and passes from the upper portion of the quadrant 226 on to sheaves 227 carried upon the end standard 2, from where it can be traced over the sheaves 222 at the opposite end of the machine back to the pusher 218.

Motion is given this quadrant 226 in the same manner as motion is imparted to the quadrant 48, that is, referring to Fig. 1, by means of the cam 33 on the end of the shaft 28 engaging the bell crank 37 and rod 41 attached to the lever arm 43 upon the shaft 44, which carries these quadrants, all as has been previously related. The time of operation of the bell crank 37 to cause the quadrant 226 to oscillate whereby motion is given to the pusher 218, is at that instant after the mold box has been pushed from the stripper table onto the entrance portion 209 of the return feed table. By this slight reciprocation of the pusher 218, assuming that the return table has a number of mold boxes thereon, will cause their movement in the direction toward the starting end of the machine and return of the quadrant 226 to that position shown in Fig. 1, will again cause return of the pusher 218 to a position to receive and push a subsequent mold box.

Immediately after the pusher 218 has caused a return movement of the mold boxes carried upon the return table, a cross feed mechanism is employed to again automatically cause the entrance of a mold box upon the main feed table.

From the description thus far given, it will be apparent that the mold boxes pass through the filling, compressing and stripping mechanism while resting upon a pallet, but that this pallet is removed after the stripping operation. These pallets are moved off of the stripper table onto the entrance portion 209 of the return table, by the first reciprocation of the pusher 199. The subsequent reciprocation of this pusher, forces the mold box onto the entrance portion 209, this mold box engaging the pallet and forcing it beyond the entrance portion 209 onto a suitable conveyer or any other suitable structure, not shown. These pallets are again collected and placed in a suitable receptacle designated 228 and shown particularly in Figs. 3, 5 and 15.

The operation of this pallet feed is as follows: The end of the shaft 28 opposite from that shown in Fig. 1, carries a bevel gear 229, Fig. 5, which meshes with a complemental bevel gear 230 carried upon a shaft 231 suitably journaled at opposite ends by two standards 232 and 233. Again referring to Figs. 3, 5 and 15, it will be seen that the shaft 231 carries a cam 234, which is used to oscillate a short counter shaft 235 by means of the rigidly connected lever 236 carrying a roller 237. Oscillation of the shaft 235 by the cam 234 also causes the lever arm 238 to slightly oscillate, forcing the feed plate 239, pivoted thereto at its upper end, to enter the pallet receptacle 228 through a slot 240. The thickness of the pallet feed plate 239 is such as will positively force one of the pallets contained within the receptacle 228 out through a slot 241 in its opposite side and onto the entrance table 1. The pallets fed in this manner are prevented from passing beyond the entrance table 1, by the wearing strips 242 secured to the cross feed table 217, these wearing strips serving the double purpose of limiting the cross feed motion of the pallets and also a working surface for the cross fed mold boxes. It will also be noted that the pallet feed plate 239 has an end formation to slightly telescope within the connecting member proper 243, but normally prevented from doing so by the spring 244, whereby a somewhat yielding connection is provided. The timing of the pallet feed is such that the pallet is fed into its position upon the entrance table 1 just prior to the cross feeding of the mold box from the return table. This operation will be now described:

Carried by the shaft 231 on the opposite side of the bearing standard 233 from which the cam 234 is located, is another cam 245 shown in detail in Fig. 3<sup>D</sup>. This cam is used to operate a bell crank 246 pivotally supported to an integral bracket 247 formed on the supporting standard 47. A clear view of this supporting bracket may be had from Fig. 3. One arm of this bell crank 246 carries a roller 248, while its opposite arm is pivotally connected to a connecting rod 249, the latter being pivotally attached at 250 to a lever 251. This latter lever 251 is pivotally mounted at 252 to a bracket 253 integrally formed upon a supporting member 46. The upper end of the lever 251 is pivotally connected at 254 to a connecting rod 255 having an adjustable turn buckle connection 256 therein. The other end of this rod 255 is pivotally connected at 257 to a pusher 258 shown in detail in Fig. 3<sup>c</sup>. This pusher 258 operates within slideways 259 formed in the cross table 217, being held in position by the strips 260 in the same manner as all of the pushers heretofore described. The rod 255 also is provided with a spring 261 to permit of a cushioning action in feeding the mold boxes from the return table onto the entrance table, if this cushioning action is desired. From the description of this portion of the structure, it will be apparent that if the return table is provided with a sufficient number of mold boxes and the pallet receptacle is provided with a sufficient number of pallets, these pallets will be automatically fed onto the entrance table 1 just prior to the feeding of the mold boxes also into this position. Referring particularly to Fig. 15, it will be noted that the wearing strips 242 are of a thickness slightly greater than the thickness of each pallet plate and thus the movement of the mold box onto the entrance table is insured after the pallet is in its position. A positive stop 262 is also provided adjacent the pallet receptacle 228 to prevent movement of the mold boxes beyond its predetermined position.

Again referring to Fig. 1 and to Fig. 16<sup>c</sup>, it will be noted that I have provided a dust gathering box. This dust gathering box is located between the second press table and the stripper table and is connected to a suction fan. As the mold boxes pass from the second press table onto the stripper table, this dust box is designed to remove all brick mixtures which may have been deposited upon the aprons of the mold boxes to prevent their admission to the working parts of my machine. Inasmuch as both the stripper and the second press table are elevated, I have made my dust box of a telescoping nature, the upper portion 263 being rigidly secured to the general framework of the machine in any desired manner and carrying a peripheral band 264. Beneath this receptable 263 is a second box 265 designed to telescope outside of the box 263 and carrying lugs 266. Between the peripheral band 264 and the lugs 266, I interpose a plurality of rods carrying springs 267 in the manner indicated. Upon the elevation of any of the mold boxes, the lower portion 265 will telescope against the tension of the springs 267, which springs cause it to automatically return upon the lowering of the mold boxes.

It is not believed that a detailed description of the operation of my machine is necessary, in view of the foregoing description, it being believed necessary only to state the same in a general way. After my machine has been set into operation, it is to be understood that the mold boxes form two strands, one upon the feed table and one upon the return table, all of the mold boxes abutting each other. Assuming that the mold box upon the stripper mechanism has been moved crosswise, the pusher 6 at the entrance end of the machine is given a forward movement, whereby the entire train of mold boxes is moved forward, the forward of these engaging a stop 268, Figs. 1 and 6, carried by the posts 158. This pusher 6 then returns to its initial position and the timing of the various operations and the distances between the filling, compressing and stripping mechanisms is such that a mold box is in position beneath each of the filling hoppers 4 and 4ª, one upon each of the press tables, and one upon the stripper table. It will, therefore, be apparent that the first filling, first compressing, second filling, second compressing and stripping operations are performed simultaneously. After the compressing action, that is, after the toggles permit the return of the press tables to their initial position, the timing is such that the pallets carrying the formed brick are transferred onto the return table, and then the mold box itself is transferred onto the return table, forcing its pallet still further. However, at the same time that the pusher 6 moves the strand of mold boxes on the feed table forward, the pusher 218 moves the strand of mold boxes carried by the return table, rearward. This will be clear when it is considered that both quadrants are carried by the shaft 44 and this also permits of the cross feed from the stripper mechanism immediately thereafter. Immediately after the cross feed on the left hand end of the machine, the cross feeds provided for the pallets and the mold boxes on the right hand end or starting end of the machine, come into operation. More specifically, each time a pallet is forced away from the stripper end of the machine, a pallet is fed into the starting end of the machine and each time a mold box is forced away from the stripper mechanism, a mold box is fed into the starting end of the machine.

What I claim, is:

1. In a brick machine, a mold box, a main framework, a stationary press head, a press table upon which said mold box is adapted to rest, means for causing a movement of said press table toward said press head, means for varying the distance said head and table move toward each other, a second stationary press head, a second press table, and means for moving said second table and second press head toward each other a constant distance for all adjustments of said first table and first press head.

2. In a brick machine, a mold box, a main framework, a press head carried by said framework, said press head being vertically adjustable, a press table upon which said mold box is adapted to rest, means for moving said table toward said press head, a second press head carried by said framework, a second press table, and means for moving said second press table toward said second press head.

3. In a brick machine, filling, compressing and stripping mechanisms, a plurality of mold boxes, a plurality of pallets upon which said mold boxes are adapted to rest, and means for automatically feeding said pallet plates into operative position beneath said mold boxes prior to the operation thereon of any of said mechanisms.

4. In a brick machine, filling, compressing and stripping mechanisms, a plurality of independent disconnected mold boxes, a plurality of pallets upon which said mold boxes are adapted to rest, means for automatically feeding said pallet plates onto said machine, and means for subsequently automatically feeding said mold boxes into operative position upon said pallets prior to the operation thereon of any of said mechanisms.

5. In a brick machine, a stationary press head, a vertically movable press table, two toggles beneath said table, a bell crank forming the lower arm of each of said toggles, and cams engaging said bell cranks to cause vertical movement of said table.

6. In a brick machine, a stationary press head, a vertically movable press table, two toggles beneath said table, a bell crank forming the lower arm of each of said toggles, a single operating shaft for said toggles, a plurality of cams on said shaft for engaging said bell cranks to cause upward movement of said table, and means on said shaft for positively insuring the return of said table after each upward movement.

7. A brick machine comprising a main framework, a main feed table, a plurality of mold boxes movable on said table, a feed box mounted in superposed relation to said table, a stationary press head mounted on said table, a press table beneath said press head, said press head being adjustable to variant heights, means for causing movement of said press table toward said press head, a second feed box mounted in superposed relation to said feed table, a second stationary press head, a second press table, means for moving said second press table toward said second press head, stripping mechanism, both of said press tables being simultaneously operable with said stripping mechanism, and means for intermittently feeding said mold boxes forward to positions beneath said feed boxes onto said press tables and opposite said stripping mechanism.

In testimony whereof I affix my signature in presence of two witnesses.

HERBERT N. KILBY.

Witnesses:
　WALTER E. L. BOCK,
　A. L. PHELPS.

Copies of this patent may be obtained for five cents each, by addressing the "Commissioner of Patents, Washington, D. C."